United States Patent
Bernhardt

Patent Number: 5,443,235
Date of Patent: Aug. 22, 1995

[54] TILT-SWIVEL HEAD FOR OPTICAL APPARATUS

[75] Inventor: Rainer Bernhardt, Rosbach, Germany

[73] Assignee: Videor Technical E. Hartig GmbH, Rodermark, Germany

[21] Appl. No.: 154,182

[22] Filed: Nov. 18, 1993

[30] Foreign Application Priority Data

Nov. 19, 1992 [DE] Germany .................... 42 38 900.3

[51] Int. Cl.⁶ .......................................... F16M 11/12
[52] U.S. Cl. ...................................... 248/278; 248/183
[58] Field of Search .............. 358/373, 374, 375, 376; 348/143; 248/278, 416, 183

[56] References Cited

U.S. PATENT DOCUMENTS

| | | | |
|---|---|---|---|
| 2,717,138 | 9/1955 | Sheehan | 248/183 |
| 3,353,776 | 11/1967 | Clemens | 248/183 |
| 3,712,571 | 1/1973 | Miller et al. | 248/183 |
| 4,233,634 | 11/1980 | Adams | 358/229 |

FOREIGN PATENT DOCUMENTS 3811523 8/1989 Germany .

Primary Examiner—Blair M. Johnson
Assistant Examiner—Catherine S. Collins
Attorney, Agent, or Firm—Felfe & Lynch

[57] ABSTRACT

A tilt-swivel head (1) for optical apparatus (19) has a housing (2), a base (4) for mounting the housing, actuators for swiveling about a first, vertical swivel shaft (AS-AS) and for tilting about a second, horizontal tilt shaft (AN-AN) connecting the housing to the apparatus (19). The extruded section (3) is mounted with its lengthwise axis horizontal, has vertical end surfaces and one horizontal portion and at least one vertical portion which, together with the remainder of the extruded section, form a single tubular hollow body. Also, the vertical swivel shaft (AS-AS) passes through the horizontal portion of the extruded section, and the horizontal tilt shaft (AN-AN) passes through the vertical portion of the extruded section. Lastly, two covers (22) are fastened on the two vertical end surfaces of the extruded section (3).

9 Claims, 4 Drawing Sheets

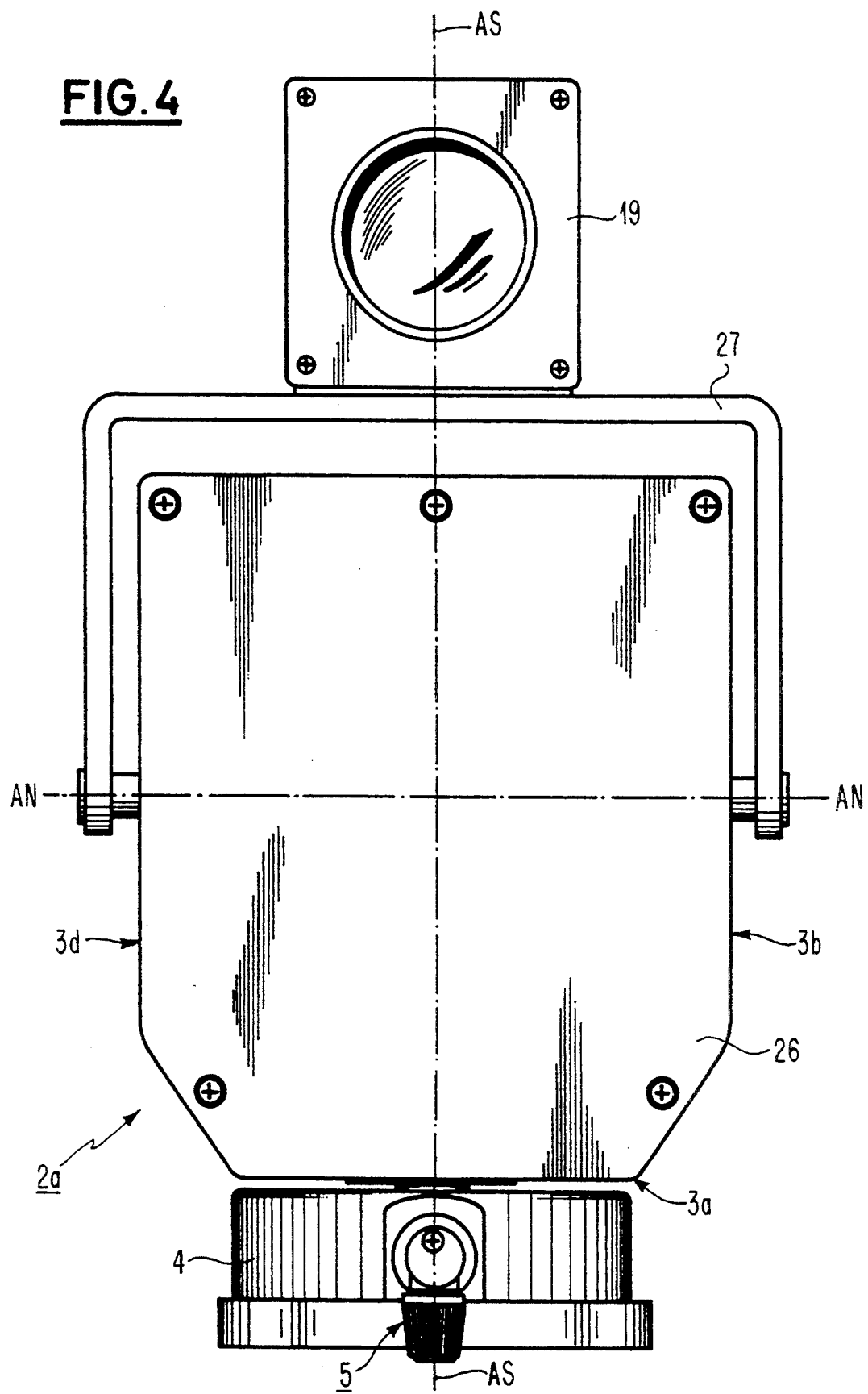

TILT-SWIVEL HEAD FOR OPTICAL APPARATUS

BACKGROUND OF THE INVENTION

The invention relates to a tilt-swivel head for optical apparatus, especially for surveillance cameras, having a housing, a mounting base for the housing, and operating means for swiveling the apparatus about a first, vertical axis AS-AS and corresponding shaft connecting the housing and the mounting base to one another, and for tilting it about a second, horizontal axis AN-AN and corresponding shaft connecting the housing to a support for the apparatus. The housing has a tubular extruded section which is closed with a cover at each end.

Such tilt-swivel heads are used principally in the field of the video surveillance of buildings and apparatus by means of self-contained video systems. The optical apparatus under discussion here are not, however, just video cameras but also searchlights, aiming devices etc.

It is not just video cameras that have a considerable weight due to their high-speed, long-range zoom objectives, but also searchlights or batteries of searchlights, whose center of gravity as a rule also is at a considerable distance from each of the two pivot axes. If it is desired to increase the number of the optical apparatus, the mechanical conditions are worsened, and it is to be taken into account that the pivoting support of the optical apparatus is a cantilevered support.

German Patent 38 11 523 discloses a housing for tilt-swivel heads which consists of a bottom part and an upper part joined together at a diagonal dividing line. The housing is rotatably joined to a mounting base in the form of a plate which in turn can be fastened on a bracket or to the ceiling of a building. Such housings, consisting of metal, are extremely expensive to manufacture, since they are needed in various sizes and with various equipment, so that it is necessary to have on hand a number of molds, dies or the like for each size of housing. If in this case a saving in the mold is achieved, a greater number of finishing steps are called for, including smoothing and painting. The round inside cross section of the bottom part of the housing limits the equipment it can contain, and especially limits the installation of rectangular plates and other components of square or rectangular profile.

It is also known, in the case of a tilt-swivel head, to manufacture the housing and mounting base from sections of tubular extrusions closed at both ends with a flat cover. The axes of the tubular extrusions of the housing and mounting base are aligned with and perpendicular to one another, so that a tower-like structure is formed. The motor controlling the swiveling movement is disposed in the mounting base, and the motor controlling the tilting movement is disposed in the housing. The mounting base thus is given an appreciable height, and the space limitations within the extruded sections make the installation of the mechanical, electrical and electronic parts difficult. The separate containment of the motors and gears also calls for a considerable amount of space. For this reason, this kind of design has been used heretofore only at the bottom end of the possible size range.

The invention therefore is addressed to the problem of devising a tilt-swivel head of the kind described in the beginning and above, whose principle of construction is appropriate even for heavy-duty models, and permits a simple and space-saving installation of the actuators and corresponding electrical and electronic components. Also, the principle of design is to permit a great range of different housing dimensions without making it necessary to stock a large number of different extruded cross sections.

The term, "actuators," as used herein is intended to refer to any mechanical and electrical actuating systems making it possible to send commands to the optical apparatus. Such actuators may consist, for example, of miniature electric motors with appropriate gearing, which can be in the form of spur gears or worm gearing, so that self-locking, for example, will be provided. It is also possible, however, to provide so-called multi-pole motors as actuators, or stepping mechanisms, all the way up to ultrasonic drives. Position indicators can also be associated with the actuators so that the reaching of a particular position can be known.

For the solution of the stated problem, such tilt-swivel heads in accordance with the invention are characterized by the fact that:
a) The extruded section is mounted with a horizontal axis AP-AP, with its cut ends vertical, and it has a horizontal side and at least one vertical side, which together with the other parts of the wall of the extruded section form a tubular hollow body.
b) The vertical pivot shaft corresponding to axis AS-AS passes through the horizontal bottom of the extruded section and is supported on the latter.
c) The horizontal tilt shaft corresponding to axis AN-AN passes through the vertical part of the extruded section and is supported thereon, and
d) The two covers with vertical sealing surfaces are fastened on the end surfaces of the extruded section and enclose the actuators between them and the extruded section.

An extruded section of this kind can be cut to length from an extruded stock of appropriate cross section, thus constituting a first possibility for variation in regard to the housing width. As regards its surface, the extruded section can be improved at low cost, e.g., by anodizing or it can be coated with plastic, without requiring complex coating processes. In particular, the smoothing operations so often required in the case of castings can be avoided. The extruded section which is open at both ends when assembly begins, and preferably is in the form of a flat frame, permits virtually unlimited access from both ends, so that the installation of the actuators and corresponding electrical and electronic components is facilitated. Since the actuators for both axes can accommodated, a very compact installation can be made, so that more powerful actuators and motors can be used without the need for greater housing dimensions. The extruded stock can consist not only of an aluminum alloy but also of an extrudable plastic or plastic mixture, with and without fiber reinforcement.

A second and much more interesting possibility of varying the housing dimensions is provided by the variable width of the geometrical shape of the two covers of the housing. Depending on the length of the extruded section, they can be in the form of flat plates with plane-parallel surfaces, which are screwed to the vertical end surfaces or sealing surfaces of the extruded section.

To special advantage, the two housing covers can also be box-like and/or domed, so that the extruded section itself can be kept correspondingly short, which greatly facilitates the installation of the parts. The housing covers are given great stability of shape by their configuration, which together with the stability of the extruded section makes up an extremely distortion-resistant housing.

Dies for extruders entail but a fraction of the cost of, for example, die-casting dies. Also, molds for the injection-molding of the housing covers, preferably from a fiber-reinforced plastic, are comparatively cheap to produce. However, covers consisting of flat or deep-drawn metal or plastic can also be used.

It is especially advantageous if the upright portion of the extruded section bears the first journal for the tilt shaft corresponding to axis AN-AN and, with a slight separation therefrom, bears a plate in which the second journal for the tilt shaft corresponding to axis AN-AN is situated, and on whose side facing away from the upright portion a motor controlling the tilting movement is fastened, and gearing for the tilt shaft corresponding to axis AN-AN is disposed in the space between.

It is furthermore advantageous if the horizontal part of the extruded section bears the first bearing for the AS-AS pivot shaft and, separated from it by a small space, a plate in which the second bearing for the AS-AS pivot shaft is situated, and on whose side facing away from the horizontal part a motor is fastened for controlling the swiveling movement, parts of a reduction gearing for the AS-AS pivot shaft being disposed in the space between.

The horizontal and vertical sides of the extruded section serve to a certain extent, in this case, as second plates for the mounting of the gears.

Other advantageous developments of the subject matter of the invention will appear in the secondary claims.

SUMMARY OF THE INVENTION

A tilt-swivel head for optical apparatus, especially for surveillance cameras, comprises a housing, a base for mounting the housing, a support, a first, vertical swivel shaft (AS-AS) joining together the housing and mounting base, and a second, horizontal tilt shaft (AN-AN) joining the housing to the support, actuators for swiveling the apparatus about the first, vertical swivel shaft and for tilting about the second horizontal tilt shaft, the housing having a tubular extruded section, covers for closing the section at both ends,
  a) the extruded section being mounted with its longitudinal axis (AP-AP) horizontal, having vertical end surfaces, and having a horizontal portion and at least one vertical portion, and having additional wall portions of the extruded section which with the end surfaces make up a tubular hollow body,
  b) the vertical swivel shaft (AS-AS) passing through the horizontal portion and supported on the latter,
  c) the horizontal tilt shaft (AN-AN) passing through the vertical portion and supported thereon, and
  d) the covers being fastened with vertical sealing surfaces against end surfaces of the extruded section and enclosing the actuators between themselves and the extruded section.

For a better understanding of the invention, together with other and further objects thereof, reference is made to the following description, taken in connection with the accompanying drawings, and its scope will be pointed out in the appended claims.

BRIEF DESCRIPTION OF THE DRAWINGS

Two embodiments of the invention are explained below with the aid of FIGS. 1 to 4.

FIG. 4 shows a variant of the subject of FIG. 2, represented in a comparable manner.

DESCRIPTION OF THE PREFERRED EMBODIMENTS

Figure 1:
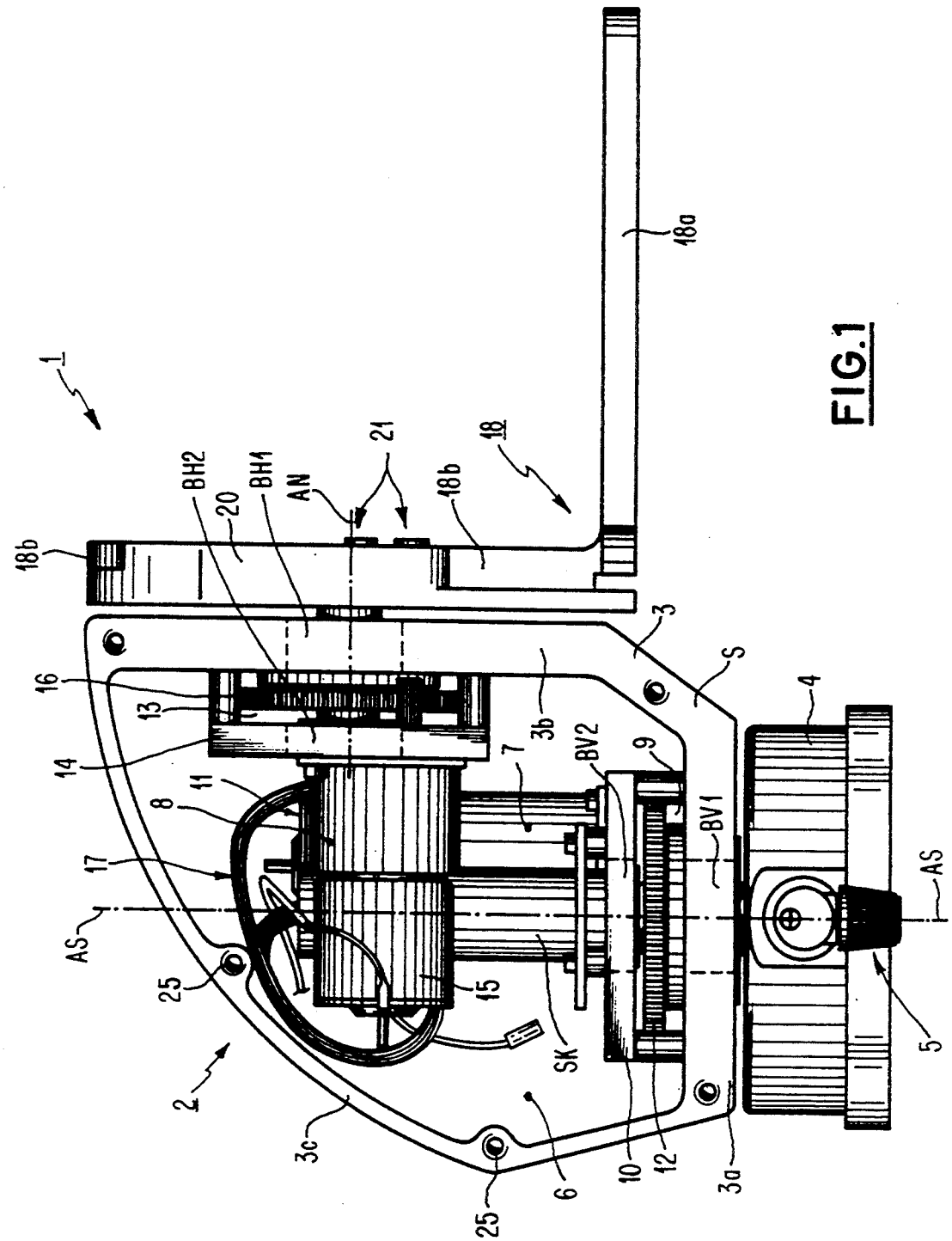
FIG. 1 shows a side view of a tilt-swivel head with covers removed.

In FIG. 1 there is shown a tilt-swivel head 1 whose central part is a housing 2 of which only the extruded cross section is shown, which forms the frame of the housing 2.

The housing 2 is disposed on a base 4 and can swivel on the latter about a vertical shaft corresponding to axis AS-AS. The base has a lateral plug connector for a multi-conductor cable which is carried inside of the hollow pivot shaft corresponding to axis AS-AS, which here is indicated symbolically by a broken line. The plug connector can also be contained in a section of the base 4 that is not shown here. The pivot shaft corresponding to axis AS-AS is preferably a system (SK) of coaxial slip rings with wiping contacts encapsulated in a cylinder, so that the tilt-swivel head can perform an unlimited number of rotations.

The extruded section 3 has a longitudinal axis AP-AP which in FIG. 1 is perpendicular to the plane of the drawing, as well as two vertical end surfaces S of which only the front-facing one is visible in FIG. 1. These end surfaces S are parallel to the swivel shaft corresponding to axis AS-AS. Also, the extruded section 3 has a horizontal portion 3a and a vertical portion 3b which together with additional wall portion 3c form a tubular hollow body. The cavity 6 thus formed serves at least substantially to accommodate the actuators 7 and 8 which will be described below. As it is apparent from FIG. 1, the vertical pivot shaft corresponding to axis AS-AS passes approximately centrally through the horizontal portion 3a and is supported thereon by a bearing shown in dashed lines. On the other hand the horizontal tilt shaft corresponding to axis AN-AN at approximate right angles thereto passes through the vertical portion 3b and is supported on the latter by an additional bearing, shown in dashed lines.

The horizontal part 3a of the extruded section therefore carries not only the bearing BV1 for the AS-AS swivel shaft, but also, above an intermediate space 9, a plate 10 on whose side facing away from the horizontal part 3a there is fastened an electric motor 11 controlling the swiveling action. In the intermediate space 9 are parts of a reduction gearing 12 for the swivel shaft corresponding to axis AS-AS. Here only the large spur gear of this reduction gearing is particularly represented.

Likewise, the vertical part 3b bears the bearing BH1, in dashed lines, for the tilt shaft corresponding to axis AN-AN and, with an intermediate space 13, a plate 14 whose side facing away from the part 3b, bears a motor 15 controlling the tilting action. Also in the intermediate space 13 are parts of a reduction gearing 16, of which only the large spur gear and an unnumbered pinion are shown. In the cavity 6 is also a section of cable 17 which is connected to the plug connector 5 via the above-mentioned system SK of slip rings and contact wipers.

In the plates 10 and 14 are second bearings BV2 and BH2 for the swivel and tilt shafts, so that these shafts will have a definite two-point mounting.

The tilt shaft corresponding to axis AN-AN is provided at its end with a platform 18 having two parts 18a and 18b at right angles to one another. Part 18a serves to hold an optical apparatus 19, represented as a video camera in FIG. 2. Part 18b, which is vertical in this position, is mounted in a guiding body 20 for adjustment radially with respect to the tilt shaft corresponding to axis AN-AN, the guiding body 20 being affixed to the tilt shaft corresponding to axis AN-AN. The radial fixation of the platform 18 with respect to the guiding body 20 is accomplished with screws 21. As it can be seen from FIG. 3, the guiding body 20 has a lobular shape and its wider end serves as a counterweight.

Figure 2:
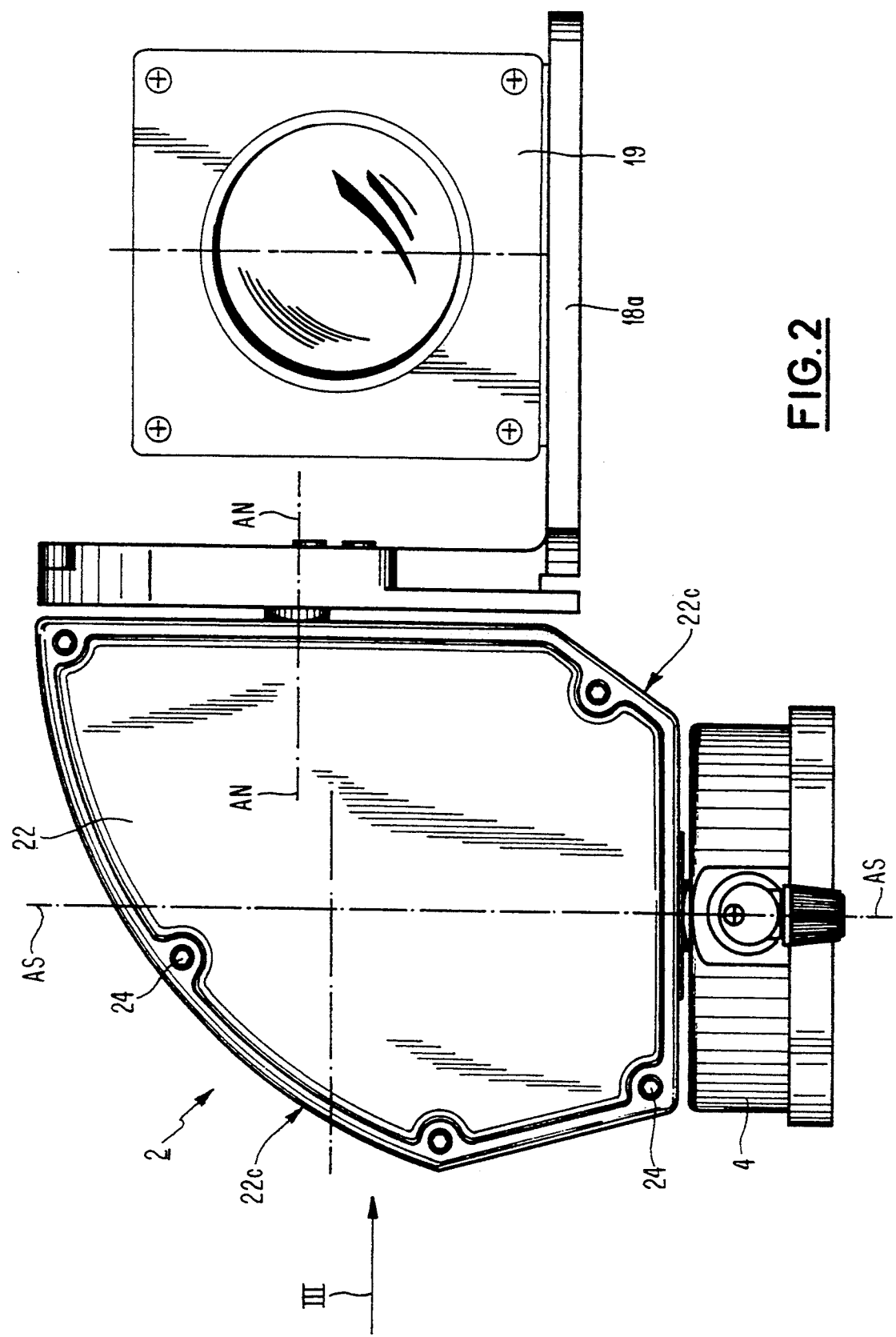
FIG. 2 a side view according to FIG. 1, but with covers in place, i.e., in the closed and ready-to-run condition, FIG. 3 a rear view of the subject of FIG. 2 seen in the direction of arrow III in FIG. 2.
Figure 3:
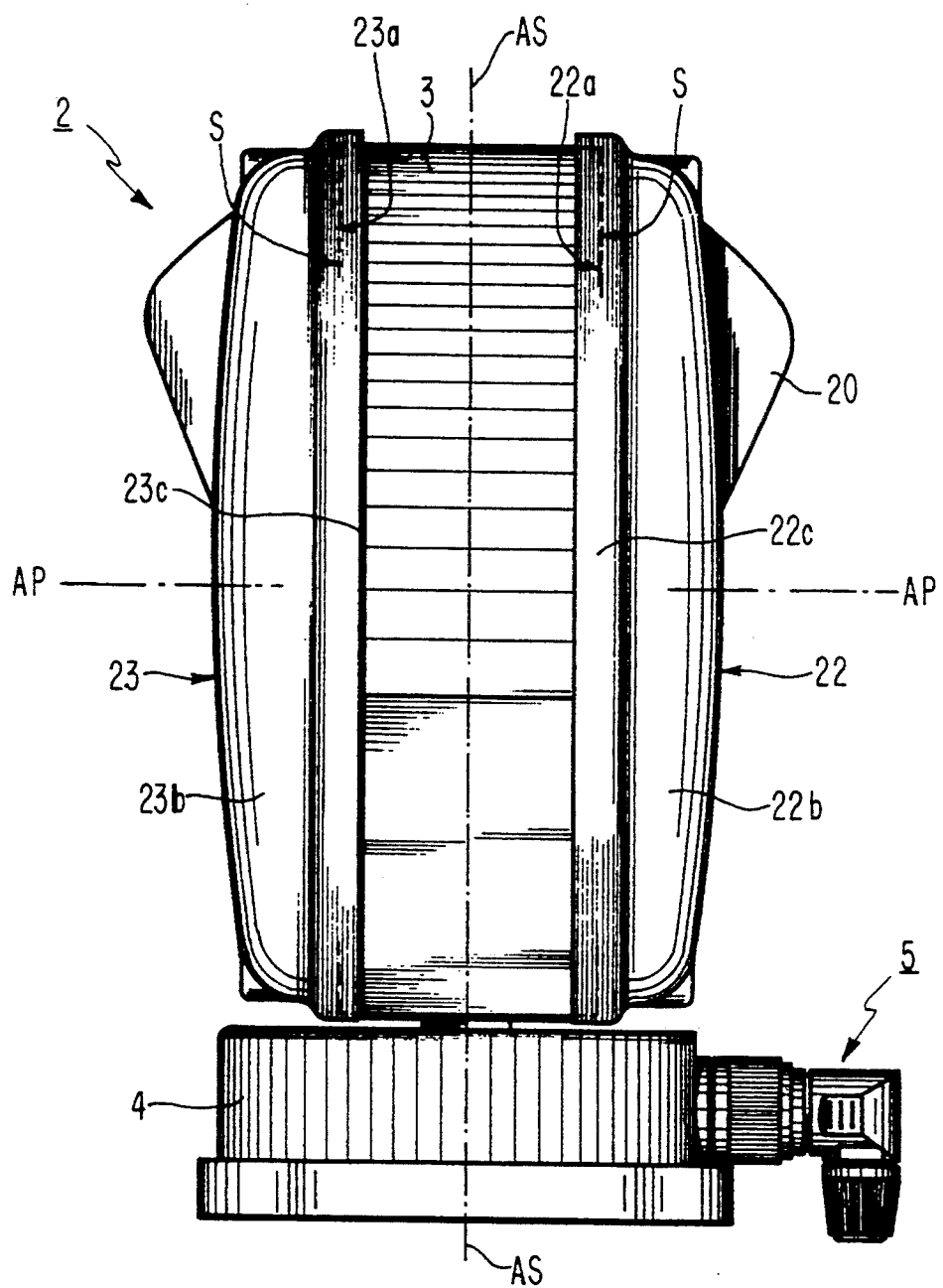

FIGS. 2 and 3 show the housing 2 and the extruded section 3, respectively, closed by two covers 22 and 23 of mirror-image symmetry. Each of these covers has sealing surfaces 22a and 23a, here represented only by broken lines, which with the interposition of a gasket (not shown) are fastened to the end surfaces S of the extruded section 3. The covers 22, 23 preferably are of a plastic, for example, a fiber-reinforced, injection-molded plastic.

As it appears from FIG. 3, the covers 22 and 23 have each a wall 22b and 23b which protrudes beyond the sealing surfaces 22a and 23a in the direction of the axis AP-AP. As shown, the wall 22b and 23b of each cover is clearly dome-shaped. In this manner additional space is created to contain laterally protruding actuators and gearing, without the need to increase the axial length of the extruded section, as it can be seen clearly in FIG. 3.

Each of these covers has a margin 22c and 23c offset from its sealing surface 22a and 23a and partially overlapping the extruded sections 3 and any inserted gasket. This has the advantage of protecting the gasket against the weather, and especially against the harmful ultraviolet rays of sunlight. This considerably improves the useful life of the gasket. As it can be seen on one side in FIG. 2, the covers 22 and 23 are screwed to the extruded section 3 by means of screws 24 which are engaged in taps 25 in the extruded section 3.

It is evident from FIG. 1 that the two motors 11 and 15 with their gearing directly attached are situated one behind the other, so that their shafts cross in cavity 6, in a staggered relationship. This provides the possibility for an extraordinarily compact assembly and for a rounding of portions 3c of the extruded section.

FIG. 4 shows a variant of the embodiment of FIG. 2: the housing 2a in this case is made in a mirror-image symmetry about the shaft corresponding to axis AS-AS in plan, and in addition to the horizontal part 3a of the extruded section it has two vertical parts 3b and 3d thereof (not visible in the plan view). By such a configuration of the housing 2a it is possible to maintain a stock of only one shape of cover 26 for each housing size, of which two covers can be placed one on each side of the extruded section. In this manner the tool costs are appreciably reduced. In this case both of the vertical parts 3b and 3d carry the tilt shaft corresponding to axis AN-AN on whose outer ends a U-shaped hanger 27 is disposed for the optical apparatus 19.

It is to be understood that the housing 2a in FIG. 4 can also be used in conjunction with a single angular support 18 in accordance with FIG. 1 mounted on one side. Even in this case the advantage remains that only a single cover shape need be kept on hand for each extruded section 3.

While there have been described what are considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Tilt-swivel head for optical apparatus especially for surveillance cameras, comprising: a housing, a mounting base for mounting the housing, a support, a first, vertical swivel shaft (AS-AS) joining together the housing and mounting base, and a second, horizontal tilt shaft (AN-AN) joining the housing to the support, actuators for swiveling the apparatus about the first, vertical swivel shaft and for tilting about the second horizontal tilt shaft, the housing having a tubular extruded section and at least two covers, a) the extruded section being mounted with a longitudinal axis (AP-AP) horizontal and said extruded section having at least two vertical end surfaces (S), a horizontal portion, and at least one vertical portion, and said extruded section having at least one additional wall portion said vertical portion, horizontal portion and said at least one additional wall portion and said vertical end surfaces (S) defining a tubular hollow body, said vertical end surfaces of said extruded section being covered by said covers,
   b) the first vertical swivel shaft (AS-AS) passing through the horizontal portion and supported on the latter,
   c) the second horizontal tilt shaft (AN-AN) passing through the at least one vertical portion and supported thereon, and
   d) the covers being fastened with vertical sealing surfaces against said end surfaces of the extruded section and enclosing the actuators between said covers and the extruded section.

2. Tilt-swivel head according to claim 1, in which the extruded section is of a light-metal alloy.

3. Tilt-swivel head according to claim 1, in which the cover is of a plastic.

4. Tilt-swivel head according to claim 1, in which at least one of the covers has a covering wall which protrudes beyond the sealing surface of the cover in the direction of the longitudinal axis (AP-AP) of the extruded part.

5. Tilt-swivel head according to claim 4, in which the covering wall is a domed covering wall.

6. Tilt-swivel head according to claim 3, in which the cover has a margin offset from its sealing surface, which partially overlaps the extruded section and an interposed gasket.

7. Tilt-swivel head according to claim 1, in which the vertical portion of the extruded section contains a first bearing BH1 for the tilt shaft (AN-AN) and, with a gap contains a plate in which a second bearing BH2 for the tilt shaft (AN-AN) is situated, and which tilt-swivel head includes on a side facing away from part of the extruded section a motor for tilting motion, parts of a reduction gearing for the tilt shaft (AN-AN) being disposed in the gap.

8. Tilt-swivel head according to claim 1, in which the horizontal portion of the housing contains a first bearing BV1 for the swivel shaft (AS-AS) and, with a gap (9), contains a plate in which a second bearing for the swivel shaft AS-AS is situated, and which tilt-swivel head includes on a side facing away from the horizontal portion a motor for the swiveling motion, parts of a reduction gearing for the swivel shaft (AS-AS) being disposed in the gap.

9. Tilt-swivel head according to claim 1, in which the covers are configured in a mirror-image symmetry with respect to one of the said shafts.

* * * * *